(12) United States Patent
Chengalvarayan et al.

(10) Patent No.: US 6,606,595 B1
(45) Date of Patent: Aug. 12, 2003

(54) HMM-BASED ECHO MODEL FOR NOISE CANCELLATION AVOIDING THE PROBLEM OF FALSE TRIGGERS

(75) Inventors: Rathinavelu Chengalvarayan, Naperville, IL (US); Richard Harry Ketchum, Naperville, IL (US); Anand Rangaswamy Setlur, Naperville, IL (US); David Lynn Thomson, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/652,398

(22) Filed: Aug. 31, 2000

(51) Int. Cl.[7] ........................... G10L 21/02; G10L 15/14
(52) U.S. Cl. ..................... 704/256; 704/226; 704/233
(58) Field of Search ............................... 704/256, 233, 704/228, 231, 226; 706/45

(56) References Cited

U.S. PATENT DOCUMENTS

| | | | | |
|---|---|---|---|---|
| 5,708,704 A | * | 1/1998 | Fisher | 704/228 |
| 5,761,090 A | * | 6/1998 | Gross et al. | 706/45 |
| 5,956,675 A | | 9/1999 | Setlur et al. | 704/231 |
| 5,978,763 A | * | 11/1999 | Bridges | 704/233 |
| 6,226,612 B1 | * | 5/2001 | Srenger et al. | 704/256 |

OTHER PUBLICATIONS

"HMM–Based Echo Model for Noise Cancellation Avoiding the Problem of False Triggers", Chengalvanyan et al, ICPACS 2000 Nov. 2000.*
R. Chengalvarayan, "On the use of normalized LPC error towards better large vocabulary speech recognition systems," Proc. ICASSP, pp. 17–20, 1998.
E.J. Diethorn, "A subband noise–reduction method for enhancing speech in telephony and teleconferencing, IEEE Workshop on Applications of Signal Processing to Audio and Acoustics," 1997.
C. Mokbel and G. Chollet, "Automatic word recognition in cars," IEEE Transactions on Speech and Audio Processing, vol. 3, No. 5, pp. 346–356, 1995.
A.R. Setlur and R.A. Sukkar, "Recognition–based word counting for reliable barge–in and early endpoint detection in continuous speech recognition," Proc. ICSLP, pp. 823–826, 1998.
J.S. Lim and A.V. Oppenheim, "Enhancement and bandwidth compression of noisy speech," Proc. IEEE, vol. 67, pp. 1586–1604, 1979.
R. Chengalvarayan, "Hybrid HMM architectures for robust–speech recognition and language identification," Proc. Systemics, Cybernetics and Informatics, vol. 6, pp. 5–8, 2000.
C–M. Liu, C–C. Chiu and H–Y. Chang, "Design of Vocabulary–Independent Mandarin Keyword Spotters," IEEE Transactions on Speech and Audio Processing, vol. 8, No. 4, pp. 483–487, 2000.

(List continued on next page.)

Primary Examiner—Doris H. To
Assistant Examiner—Daniel A. Nolan (57) ABSTRACT

An automatic speech recognition system for the condition that an incoming caller's speech is quiet and a resulting echo (of a loud playing prompt) can cause the residual (the portion of the echo remaining after even echo cancellation) to be of the magnitude of the incoming speech input. Such loud echoes can falsely trigger the speech recognition system and interfere with the recognition of valid input speech. An echo model has been proven to alleviate this fairly common problem and to be effective in eliminating such false triggering. Further, this automatic speech recognition system enhanced the recognition of valid speech was provided within an existing hidden Markov modeling framework.

2 Claims, 6 Drawing Sheets

OTHER PUBLICATIONS

M.M. Sondhui and D.A. Berkley, "Silencing echos on the telephone network," Proc. IEEE, vol. 68, pp. 948–963, 1980.

S.L. Gay and J. Benesty, "Acoustic signal processing for telecommunication," Kluwer Academic Publishers, pp. 1–19, 2000.

S. Katagiri, B–H. Juang and C–H. Lee, "Pattern recognition using a family of design algorithms based upon the generalized probabilistic descent method," Proc. IEEE, vol. 86, No. 11, 1998, pp. 2345–2373.

* cited by examiner

HMM-BASED ECHO MODEL FOR NOISE CANCELLATION AVOIDING THE PROBLEM OF FALSE TRIGGERS

TECHNICAL FIELD

This invention relates to automatic speech recognition and more particularly to automatic speech recognition methods and systems for interacting with telephone callers cross a network.

BACKGROUND OF THE INVENTION

In telephony, especially mobile telephony, speech signals are often degraded by the presence of acoustic background noise as well as by system introduced interference. Such degradations have an adverse effect on both the perceived quality and the intelligibility of speech, as well as on the performance of speech processing applications in the network. To improve the perceived speech quality, noise reduction algorithms are implemented in cellular handsets, often in conjunction with network echo cancellers as shown by an article of E. J. Diethorn, "A subband noise-reduction method for enhancing speech in telephony and teleconferencing," IEEE Workshop on Applications of Signal Processing to Audio and Acoustics," 1997. The most common methods for noise reduction assume that acoustic noise and speech are picked up by one microphone. These methods are mostly based on spectral magnitude subtraction where the short-term spectral amplitude of noise is estimated during speech pauses and subtracted from the noisy microphone signal as shown in the article of J. S. Lim and A. V. Oppenheim, "Enhancement and bandwidth compression of noisy speech," Proc. IEEE, Vol. 67, pp. 1586–1604, 1979. The spectral magnitude subtraction method inherently implies the use of a voice activity detector (VAD) to determine at every frame whether there is speech present in that frame, such as found in U.S. Pat. No. 5,956,675, which is hereby incorporated by reference, and a related article by A. R. Setlur and R. A. Sukkar, entitled "Recognition-based word counting for reliable barge-in and early endpoint detection in continuous speech recognition," Proc. ICSLP, pp. 823–826, 1998. The performance of these methods depends a great deal on the efficacy of the VAD. Even though about 12 to 18 dB of noise reduction can be achieved in real-world settings, spectral subtraction can produce musical tones and other artifacts which further degrade speech recognition performance as indicated in an article by C. Mokbel and G. Chollet, "Automatic word recognition in cars," IEEE Transactions on Speech and Audio Processing, Vol. 3, No. 5, pp. 346–356, 1995.

When the interference causing the degradation is an echo of the system announcement, then echo cancellers are able to reduce this type of echo by up to about 25 dB and such echo cancellers generate very few artifacts. However, if the echo is loud and the incoming speech is quiet, the residual echo energy following cancellation still begins to approach the level of the incoming speech. Such echoes sometimes cause false triggering of automatic speech recognition, especially in systems that allow users to interrupt prompts with spoken input. It is desirable to reduce or remove any such false triggers and the speech recognition errors they cause. Even when these echoes do not cause automatic speech recognition errors, such echoes do interfere with the recognition of valid input, and it is desirable to reduce any such interference.

SUMMARY OF THE INVENTION

Briefly stated in accordance with one aspect of the invention the aforementioned shortcomings are addressed and an advance in the art achieved by providing a method for preventing a false triggering error from an echo of an audible prompt in an interactive automatic speech recognition system which uses a plurality of hidden Markov models of the system's vocabulary with each of the hidden Markov models corresponding to a phrase that is at least one word long. The method includes the steps of receiving an input which has signals that correspond to a caller's speech and an echo of the audible prompt of the interactive automatic speech response system; using a hidden Markov model of the audible prompt's echo along with the plurality of hidden Markov models of the system's vocabulary in the automatic speech recognition system to match the input when an energy of the echo of the audible prompt is at most the same order of magnitude as the energy of the signals that correspond to the caller's speech instead of falsely triggering a match to one of the plurality of hidden Markov models of the vocabulary.

In accordance with another aspect of the invention, the aforementioned shortcomings are addressed and an advance in the art achieved by a speech recognition system for connection to a telephone network and telephone equipment of a caller that introduce an echo of a prompt played by the speech recognition system to reduce false triggering by the echo. The speech recognition system includes a network interface connecting the speech recognition system to a telephone line of the telephone network. When the network interface unit receives a call from caller via said telephone network, a play-prompt unit plays a prompt via the network interface unit to the caller to prompt a response from the caller. At the same time, also in response to the call and in response to the playing of the prompt, a network echo canceller partially cancels the echo of the prompt that is present in the call received by the network interface unit. The echo canceller is connected to an automatic speech recognizer and sends the input from the caller along with the partially cancelled echo of the prompt to the automatic speech recognizer. The automatic speech recognizer, which has a prompt echo model, prevents the automatic speech recognizer from falsely triggering on the partially cancelled echo and the automatic speech recognizer correctly recognizes the caller's response.

DETAILED DESCRIPTION

Figure 1:
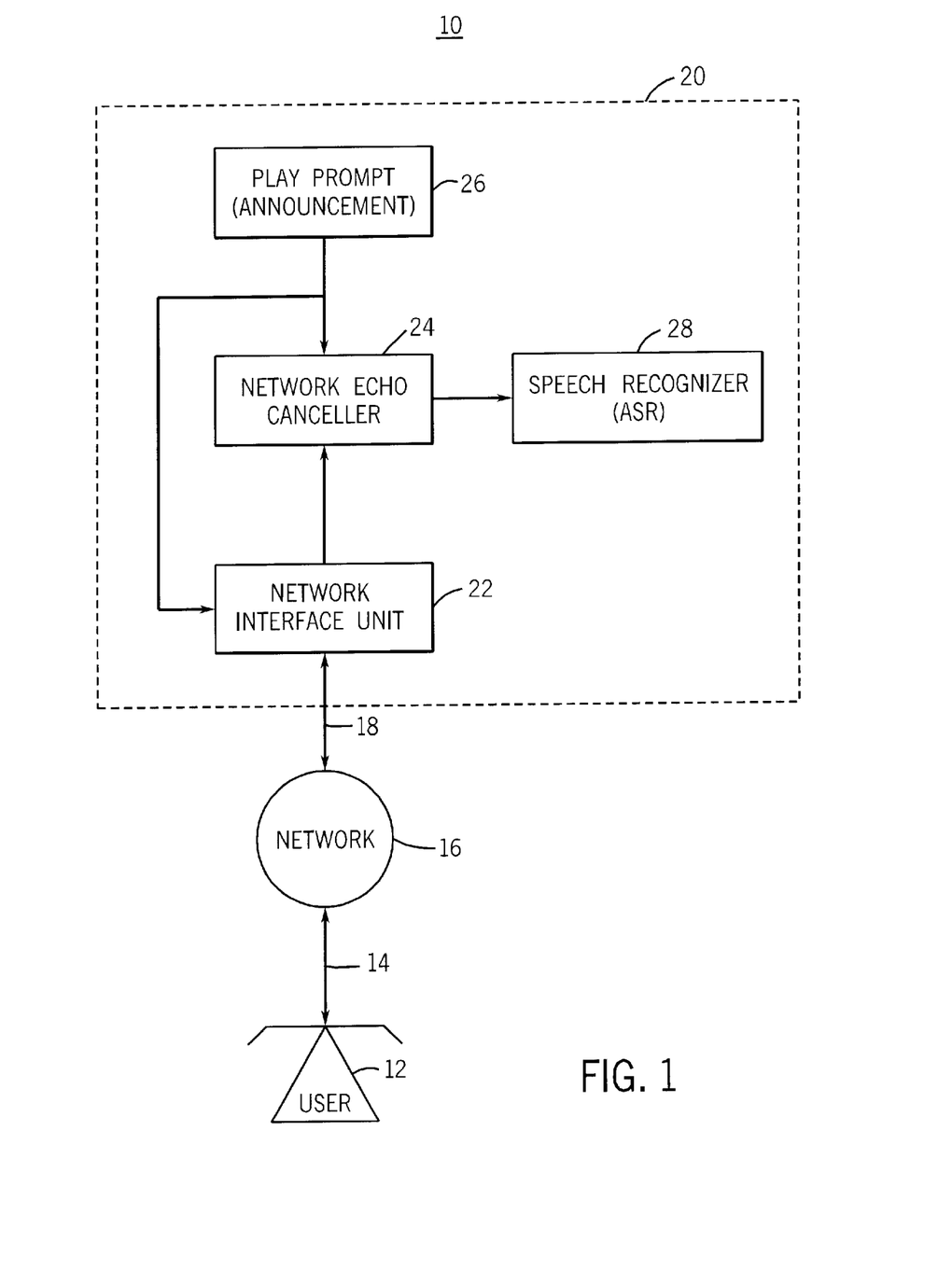
FIG. 1 is a simplified block diagram of an arrangement useful for practicing the invention.

FIG. 1 shows an arrangement 10 for using the invention. The arrangement 10 has a user station 12 connected by a telephone line 14 to a telephone network 16. The telephone network has switching circuits which connect the user station 12 to interactive speech recognition and response system 20 by telephone line 18. The user station 12 can be a handset, a speaker telephone or similar device. Such user stations are subject to acoustic coupling an may be one source of an echo. Telephone lines 14 and/or 18 may be analog lines and may be another source of an echo because of electric signal reflections at impedance mis-match nodes. The system 20 is an interactive speech response system that prompts a caller/user for information and then uses speech recognition to recognize the user's spoken responses. The preferred embodiment of the system 20 is a dial-up movie information system which prompts the user to speak the title of the movie about which the user wants schedule and/or location information. However, many similar embodiments for example banking, switchboard, and public information are minor modifications and considered to be within the scope of the present invention.

System 20 has an interface unit 22 for connecting to the telephone line 18. Interface unit 22 receives the signal from the telephone line 18 and transmits prompts and/or announcements provided by play prompt unit 26. After interface unit 22 receives the signal from telephone line 18 it connects that signal to network echo canceller 24. As mentioned previously, there are numerous sources for echo in the arrangement 10. The user station 12, lines 14 and 18 and their connection points are all potential sources of echoes of the prompt from play prompt unit 26. So echo canceller 24 uses the prompt from unit 26 which the canceller 24 adaptively attenuates and subtracts from the incoming user signal on line 18. After the echo cancellation, the input signal is connected to automatic speech recognition (ASR) unit 28. The echo canceller 24, as mentioned above, cannot prevent false triggering of ASR unit 28 when the spoken input is low or non-existent and the prompt echo is loud. ASR unit 28 uses a number of hidden Markov models (HMMs). Each HMM is a model of a word or words that are expected responses, which for a movie information system are the titles of the movies currently playing. The models of the expected responses is called the vocabulary of the ASR unit 28. In addition to the expected spoken responses is the "silence model" which may be silence and it may also be environmental and/or background noise one would hear during a lapse in speech at the user station 12 during a call. According to the present invention, a HMM of the prompt echo is added to the ASR unit 28 besides the vocabulary HMMs and the silence HMM.

Figure 2:
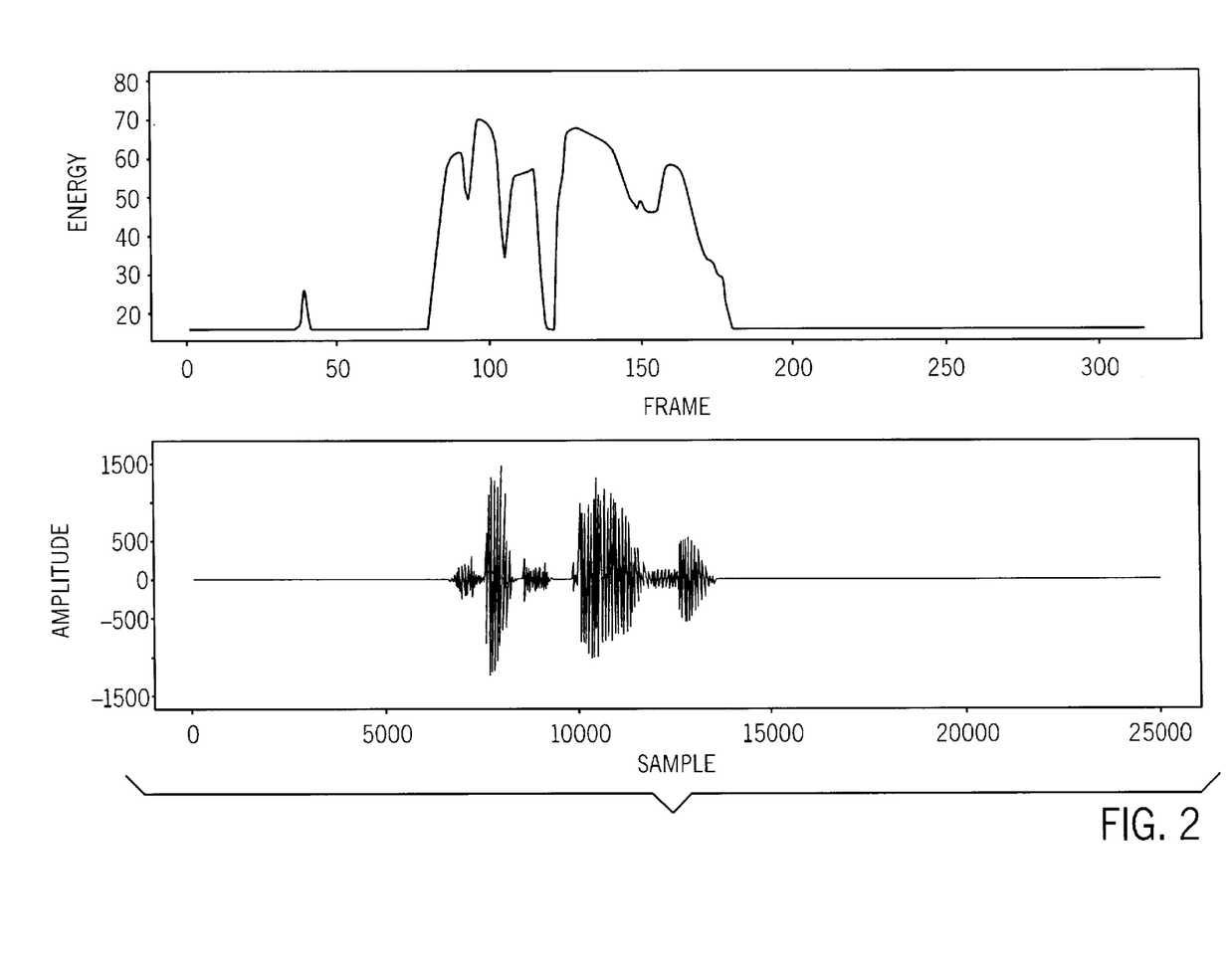
FIG. 2 shows energy measurement contours and input signal for a movie title spoken by a male speaker in a non-echo connection.

Referring now to FIG. 2, energy measurement contours and input signal is shown spoken by a male speaker. The data were collected over a purely digital T1 line. It is notable that this plot of the data contains no echoes. That is not surprising since there are no mismatch reflections on a digital line and if the user uses a handset close to their ear and mouth, there is little or no acoustic echoes. So FIG. 2 shows the ideal condition, which would not need the present invention.

Figure 3:
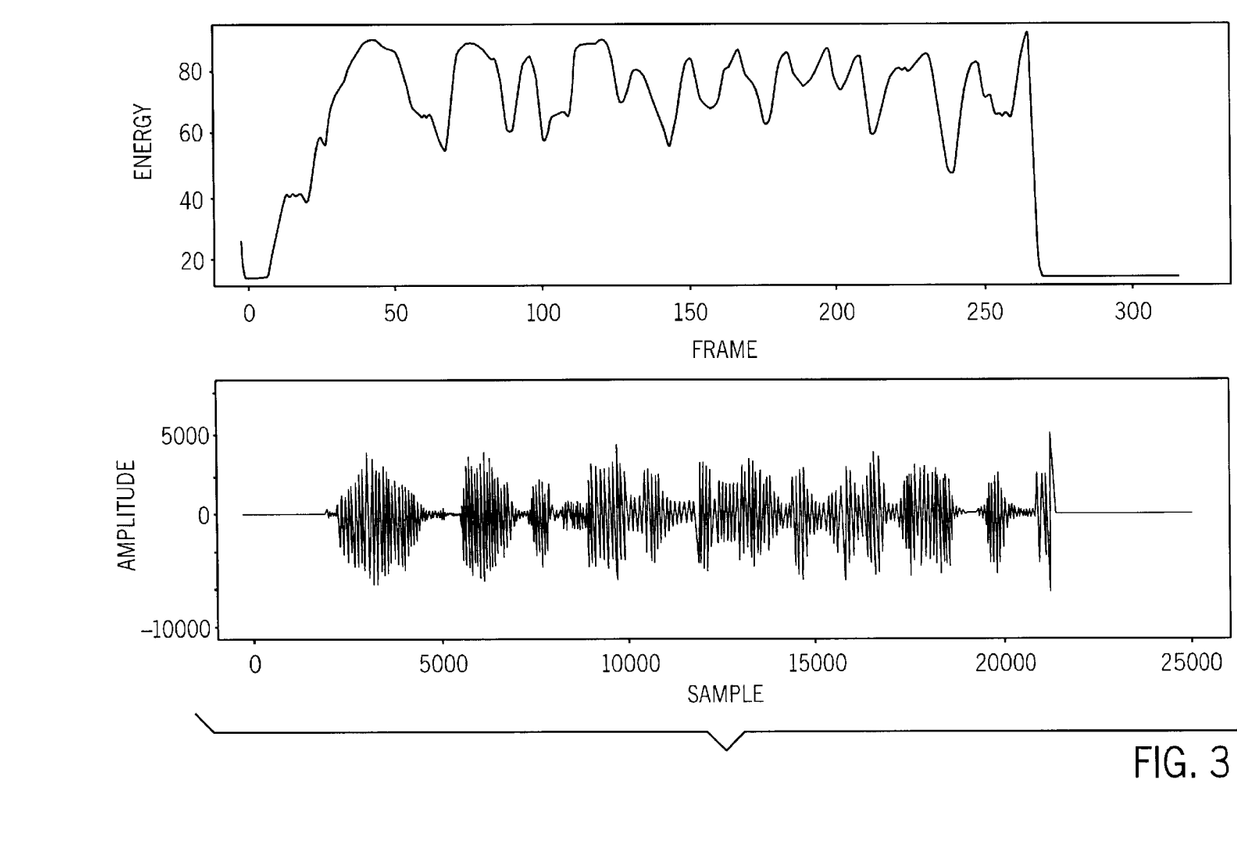
FIG. 3 shows energy measurement contours and input signal for the prompt before any echoes or corruption.

FIG. 3 shows energy measurement contours and input signal for the prompt "Please say the name of the movie you would like to see" spoken by a male speaker. This is as it looks coming out of play prompt unit 26 and network interface 22.

Figure 4:
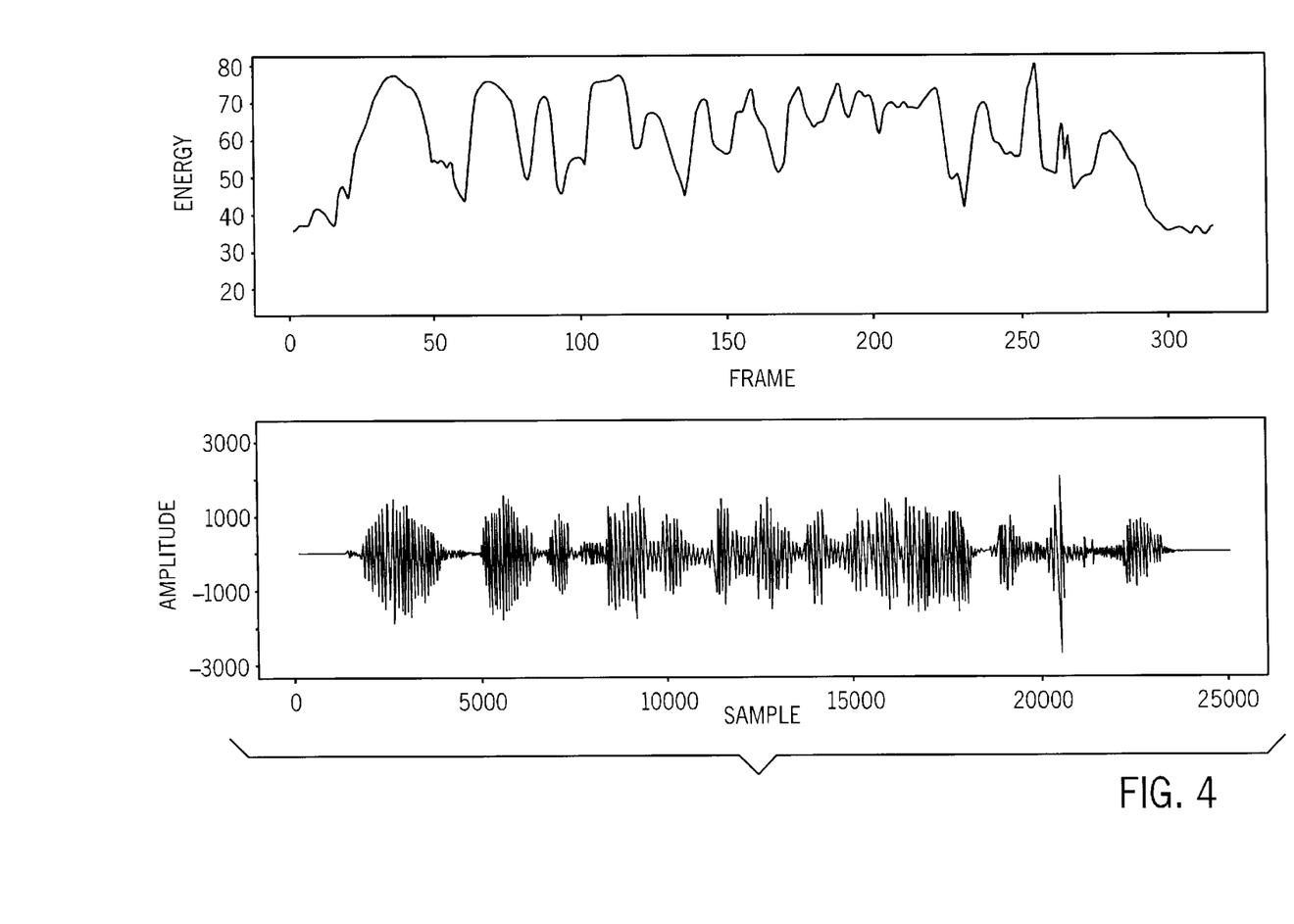
FIG. 4 shows an energy and amplitude plots for the spoken movie title and echoes before echo cancellation.
Figure 5:
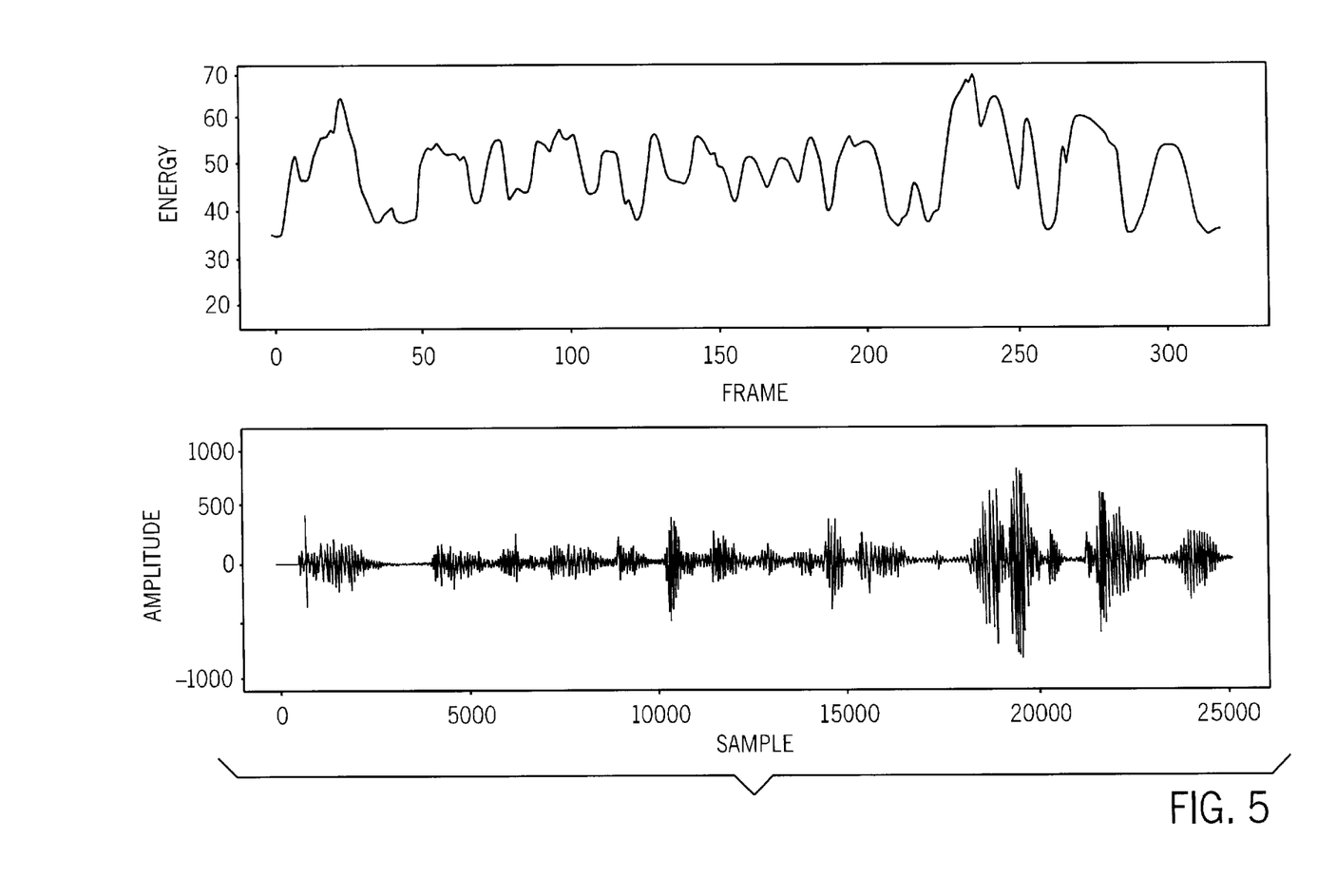
FIG. 5 shows an energy and the corresponding amplitude plots for the movie title after echo cancellation.

The system prompt as shown in FIGS. 1 and 3 is connected to the user at station 12 and he or she, in turn, speaks back to the ASR system 28. The user input is corrupted with an additive echo that results from the reflection of the prompt due to the presence of one or more hybrids and/or mis-match nodes. The resulting combined signal is shown in FIG. 4. This resulting echo needs to be cancelled prior to performing automatic speech recognition. Not doing echo cancellation prior to automatic speech recognition would result in the system prompt echo falsely triggering the recognition system. An active echo canceller takes the system prompt and the echo corrupted user speech as a combined input and uses an adaptive finite impulse response (FIR) filter to remove as much as the echo as possible. The resultant echo cancelled speech output from the active echo canceller is shown in FIG. 5. FIG. 5 shows an energy plot and a corresponding amplitude plot for the movie title after echo cancellation. The movie title spoken input "Shakespeare in Love" begins at about sample 18000 and runs to the end. Most of the rest of the combined signal shown in FIG. 5 are residual echoes from the prompt shown in FIG. 3. The combined signal shown in FIG. 5 is then connected to the ASR unit 28 for processing as depicted in FIG. 1.

Echo Modeling

If the echo is loud and the incoming speech is quiet, then the residual echo following even very good echo cancellation begins to approach the magnitude of the incoming speech, as shown in FIG. 5. These echo residuals can interfere with proper recognition. In the present invention the echoes are modeled using hidden Markov model (HMM) based maximum likelihood (MLE) and minimum classification error (MCE) training methods. By building a model for the echo, the ASR unit 28 is able to identify that the incoming signal is an echo, not speech from a caller/user. This ability makes the ASR unit 28 more resistant to such interfering residual echoes.

This technique is illustrated by using the movie title recognition task as an example. The echo model is based on recordings of users calling the system 20 that provides movie information. Of these recordings, 1313 speech files were manually selected that contained only residual echoes (no speech from callers) of the prompt. These files had been processed by the echo canceller (see FIG. 1) and represented a variety of acoustic environments with varied signal strengths and durations. The specific prompt from play prompt unit 26 for this example was "Please say the name of the movie you would like to see," recorded by a male speaker. A 1-state, 32-mixture continuous density HMM-based echo model was built using one iteration of MLE and five iterations of MCE training using all the available echo files using model building techniques similar to those in the article: R.Chengalvarayan, "On the use of normalized LPC error towards better large vocabulary speech recognition systems," Proc. ICASSP, pp. 17–20, 1998. Only the silence and the echo model parameters were updated during MCE training and all the other speech models were untouched.

Figure 6:
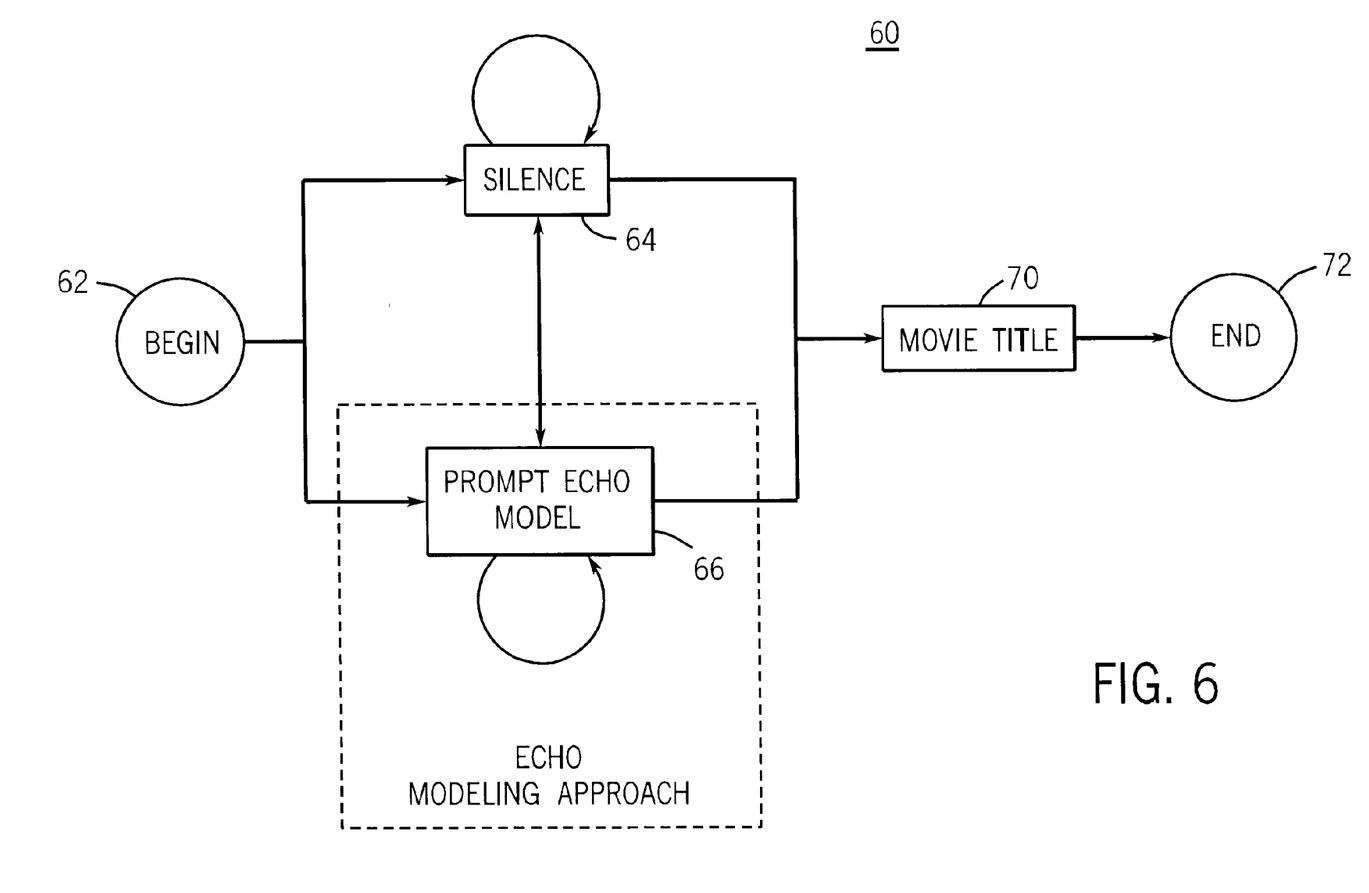
FIG. 6 is a block diagram illustrating a grammar network for movie title recognition task.

A grammar network 60 for the recognition task is shown in FIG. 6. This frameworks which starts at Begin 62 and concludes at End 72, models the prompt echoes via the echo model 66 positioned in the front of movie title models 70. The incoming speech can stay in either the silence model 64 or the echo model 66 and may loop back and forth between these two models until a valid movie title segment is found. Then subword phone models 70 with grammar constraints are used to decode the spoken movie name. The advantage of the approach in FIG. 6 is that any prompt echo residual can be and is 'absorbed' by the prompt echo model 66. The recognition task shown in FIG. 6 is executed by ASR unit 28 shown in FIG. 1 from data stored in memory internal thereto and not shown.

The residual output from echo canceller 24 has a unique signature that is characterized by the echo model 66. For example, it tends to be uniformly whiter than normal speech. This distinction allows the echo model 66 to effectively help the ASR unit 28 distinguish echoes from caller input. Although one could consider building a general echo model, trained over many sentences from varied voices, the experiment here used an echo model based on single recorded prompt. This narrow training strategy made the echo model 66 a better discriminator, though it has the possible drawback of requiring retraining if the prompt changes.

Operational Results

The operational task was a trial of an ASR based service which accepted spoken queries from callers over the telephone concerning movies playing at local theaters. This task, referred to as 'the movie list', was interesting for evaluating noise control techniques because it contained a large number of ill-formed utterances, speakers with a variety of speaking styles and energy levels, and relatively strong announcement echoes. 'The movie list' testing set consisted of 817 speech files containing 66 current movie titles (Baby-geniuses, Tarzan, Star-wars etc., featured during the summer of 1999) spoken by about 12 native speakers. Due to the nature of the analog portion of the telephone connection in the trial, echoes were significantly stronger that those encountered in a typical speech recognition system, thus presenting the ASR unit 28 and echo canceller 24 with an unusually difficult task. The training set for building the context-independent subword models consisted of 9865 generic English phrases recorded over the telephone network in a U.S. wide data collection covering each dialect region.

Input speech was sampled at 8 kHz and segmented into overlapping frames 30 msec long with centers 10 msec apart. Each frame was windowed with a Hamming window and then processed using a 10th-order linear predictive coder (LPC)-analyzer. The recognizer feature set consists of 39 features that includes the 12 LPC-derived liftered cepstral coefficients, log-energies, and their first and second order derivatives similar to those of M. M. Sondhi and D. A. Berkley, "Silencing echoes on the telephone network," Proc. IEEE, Vol. 68, pp. 948–963, 1980. The energy feature was batch normalized during training and testing similar to training and testing in R. Chengalvarayan, "Hybrid HMM architectures for robust speech recognition and language identification," Proc. Systemics, Cybernetics and Informatics, Vol. 6, pp. 5–8, 2000. Since the signal was recorded under various telephone conditions and with different transducer equipment, each cepstral vector was further processed using batch-mode cepstral mean subtraction to reduce the effect of channel distortion. The subword model set used in recognition consisted of 41 context independent units. Each subword was modeled by a three-state left-to-right continuous density HMM with only self and forward transitions. A mixture of Gaussian functions with diagonal covariances was employed to estimate the density function for each state. A maximum of 16 mixtures per state was allowed. The silence/background was modeled with a single state, 32 Gaussian mixture HMM, similar to that described by M. M. Sondhi and D. A. Berkley, "Silencing echoes on the telephone network," Proc. IEEE, Vol. 68, pp. 948–963, 1980. Lexical representations of movie titles were obtained by preprocessing the orthographic transcriptions through a pronunciation software module designed for use in text-to-speech. The initial model set of 41 subword units was trained using a conventional maximum likelihood training procedure, as in R. Chengalvarayan, "Hybrid HMM architectures for robust speech recognition and language identification," Proc. Systemics, Cybernetics and Informatics, Vol. 6, pp. 5–8, 2000. Then five iterations of MCE training were applied to the initial boot model with null grammar. The number of competing string models was set to four.

TABLE 1

| Items | Baseline | Present Invention (echo residual model) |
| --- | --- | --- |
| String Accuracy | 88.49% | 91.6% |
| Computation Time | 4329 sec | 4234 sec |

'The movie list' speech recognition results showing comparative performance of the baseline and baseline with echo model are summarized in Table 1. The results show that the single echo model built for a specific announcement provides good accuracy, low complexity and more echo-resistance. A 27% string error rate reduction was obtained by using the echo residual model (right most numerical values) compared to using the echo canceller alone (left most numerical values). Most of the false triggers due to strong echoes were removed when using the echo modeling approach according to the present invention.

Test results have shown that the proposed echo model built for a specific announcement provided a 27% string error rate reduction when compared to not using the echo model topology during decoding. The test results also show that the processing time taken by the ASR unit 28 is approximately 2% less to achieve the more accurate results.

One embodiment of the present invention provides modeling echoes residuals using HMM-based maximum-likelihood and minimum classification error training methods. This approach was proven to be effective in eliminating false triggering and improving recognition accuracy. Test results have shown that a single echo model built for a specific announcement provided good accuracy and low complexity. Most false triggers due to strong echoes were eliminated. Other embodiments could also be obtained by building an echo model of each word in the entire announcement, then linking each model in sequence to track the exact echo that precedes valid speech movie title. By modeling exactly, even better recognition accuracy and less false triggering could be obtained, with a possible increase in computational complexity.

Although this invention has been described with respect to a preferred embodiment, those skilled in the art may devise numerous other arrangements without departing from the scope of the invention as defined in the following claims.

What is claimed is:

1. A method for preventing a false triggering error from an echo of an audible prompt in an interactive automatic speech recognition system which uses a plurality of hidden Markov models of the system's vocabulary with each of the hidden Markov models corresponding to a phrase that is at least one word long, comprising the steps of:

building a hidden Markov model of the audible prompt's echo from a plurality of samples of the audible prompt's echo;

receiving an input which includes signals that correspond to a caller's speech and an echo of the audible prompt of the interactive automatic speech response system; and using the hidden Markov model of the audible prompt's echo along with the plurality of hidden Markov models of the system's vocabulary in said automatic speech recognition system to recognize said input when an energy of said echo of the audible prompt is at least the same order of magnitude as the energy of the signals that correspond to the caller's speech instead of falsely triggering recognition of one of the plurality of hidden Markov models of the vocabulary.

2. The A method for preventing a false triggering error from an echo of any audible prompt of a plurality of audible prompts in an interactive automatic speech recognition system which uses a plurality of hidden Markov models of the system's vocabulary with each of the hidden Markov models corresponding to a phrase that is at least one word long, comprising the steps of:

building hidden Markov models for each of said plurality of audible prompts from a respective plurality of samples of each of the audible prompt's echoes;

receiving an input which includes signals that correspond to a caller's speech and an echo of one of the plurality of audible prompts of the interactive automatic speech response system; and     using the hidden Markov models of the plurality of audible prompt echoes along with the plurality of hidden Markov models of the system's vocabulary in said automatic speech recognition system to recognize said input when an energy of the echo of the audible prompt is at least the same order of magnitude as the energy of the signals that correspond to the caller's speech instead of falsely triggering recognition of one of the plurality of hidden Markov models of the vocabulary.

* * * * *